(12) United States Patent
Li (10) Patent No.: US 8,538,209 B1
(45) Date of Patent: Sep. 17, 2013

(54) METHODS AND APPARATUS OF WDM FIBER REFLECTOR

(75) Inventor: Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 294 days.

(21) Appl. No.: 12/861,471

(22) Filed: Aug. 23, 2010

(51) Int. Cl.
*G02B 6/26* (2006.01)
*G02B 6/42* (2006.01)

(52) U.S. Cl.
USPC ............ 385/31; 385/33; 385/34; 385/47; 385/48; 398/82; 398/83; 398/84; 398/85; 398/86; 398/87; 398/88; 398/48; 398/49; 398/50; 398/51

(58) Field of Classification Search
None
See application file for complete search history.

(56) References Cited

U.S. PATENT DOCUMENTS

| 4,550,975 | A | * | 11/1985 | Levinson et al. | 385/34 |
| 6,535,668 | B2 | * | 3/2003 | Liu et al. | 385/33 |
| 7,231,116 | B2 | * | 6/2007 | Tanaka et al. | 385/34 |
| 2007/0041683 | A1 | * | 2/2007 | Keyworth | 385/24 |

* cited by examiner

*Primary Examiner* — Uyen Chau N Le
*Assistant Examiner* — Chad Smith
(74) *Attorney, Agent, or Firm* — Wuxi SinoIP Agency, Ltd.; Joe Zheng (57) ABSTRACT

New designs of optical devices, particularly for dropping a selected wavelength or a group of wavelengths as well as demultiplexing a multiplexed signal into several signals, are disclosed. An optical device employs thin film filters with reflectors to reassemble as a fiber Bragg grating. Depending on implementation, a reflector may be a mirror or a coated substrate disposed in a unique way to reflect a light beam from a filter back to a common port of a device. The reflector may also be coated accordingly to bypass a certain portion of the light beam for other purposes. As a result, the optical devices so designed in accordance with the present invention are amenable to small footprint, enhanced impact performance, lower cost, and easier manufacturing process.

16 Claims, 8 Drawing Sheets

FIG. 1

Prior Art

FIG. 2

Prior Art

FIG. 4

Prior Art

METHODS AND APPARATUS OF WDM FIBER REFLECTOR

BACKGROUND OF THE INVENTION

1. Field of the Invention

The present invention is generally related to the area of optical communications. More particularly, the present invention is related to optical devices with fiber Bragg grating features but structured with thin film filters and the method for making the same.

2. The Background of Related Art

A fiber Bragg grating (FBG) is a type of distributed Bragg reflector constructed in a short segment of optical fiber that reflects particular wavelengths of light and transmits all others. This is achieved by adding a periodic variation to the refractive index of the fiber core, which generates a wavelength specific dielectric mirror. A fiber Bragg grating can therefore be used as an inline optical filter to block certain wavelengths, or as a wavelength-specific reflector.

Figure 1:
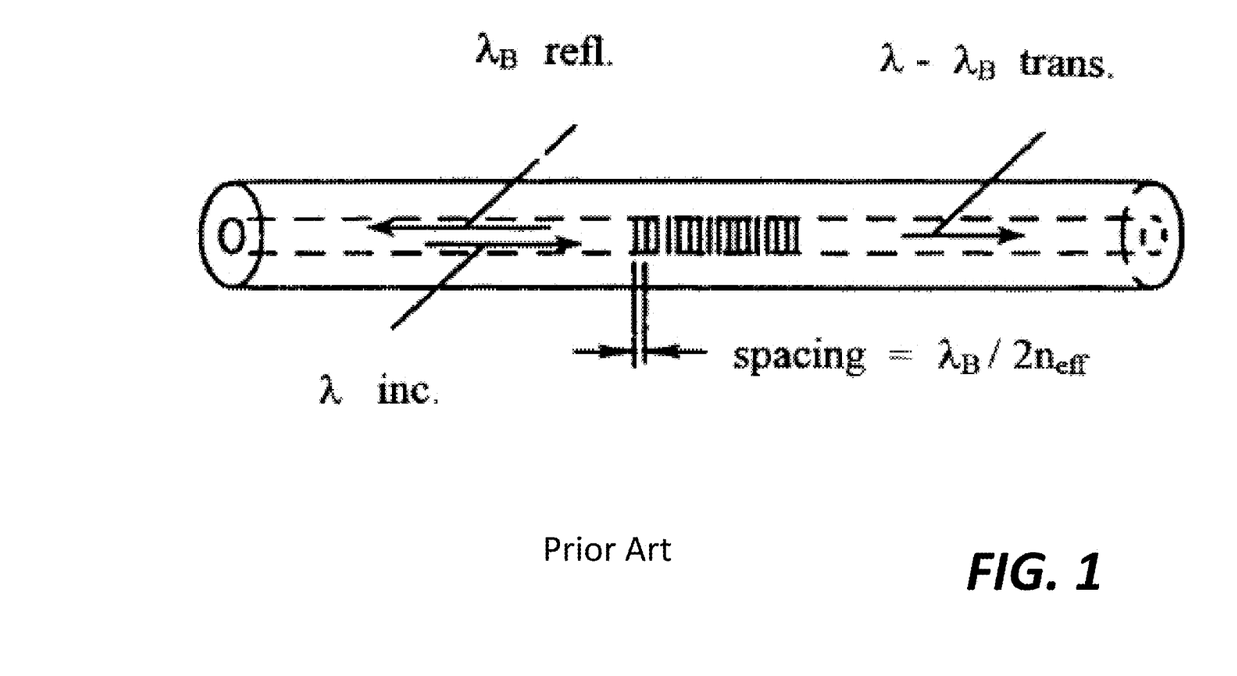
FIG. 1 shows an example of a section of fiber with a Bragg reflector.

It is well known that using a photo sensitive fiber core material and a strong UV irradiation in a patterned mask, periodic refractive index change induced by the mask generated interference pattern along the fiber core can create a FBG which retro-reflects a band of spectrum from an incoming signal. FIG. 1 shows an example of a section of fiber with a Bragg reflector. FBG has been used to create the wavelength division multiplexing (WDM) system where multiple such FBG's are used, each of which rejects or demultiplexes a narrow band of WDM signals. However, due to the fact that (1) FBG's fabrication is slow and non-mass production oriented; and (2) FBG must be used in conjunction with a fiber circulator to separate the demultiplexed signals from the input signal stream and the circulator is very expensive, the FBG's became less popular to other WDM technologies, such as those based on thin film filters (TFF).

TFF technology has been popular and gaining momentum in recent years. However, TFF exhibits some properties in almost reverse fashion as FBG does. While FBG rejects a narrow band but passes the remaining spectrum, TFF does oppositely by passing a narrow spectrum and reflects the remaining spectrum portions. For certain applications where rejection of a narrow spectrum in a retro-reflection fashion is preferred, markets expect something that can preserve this property but to be as cost effective as TFF can support.

Figure 2:
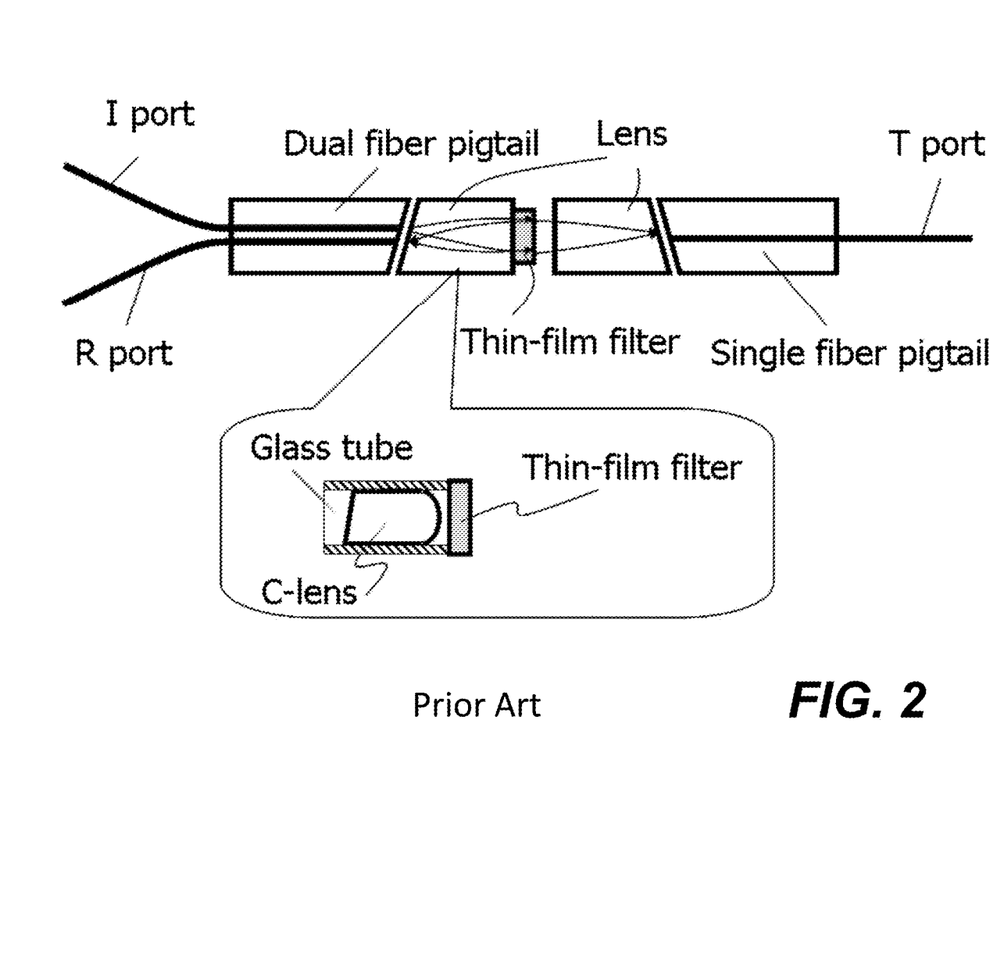
FIG. 2 shows another prior art known as a TFF based WDM 3-port filter.
Figure 3:
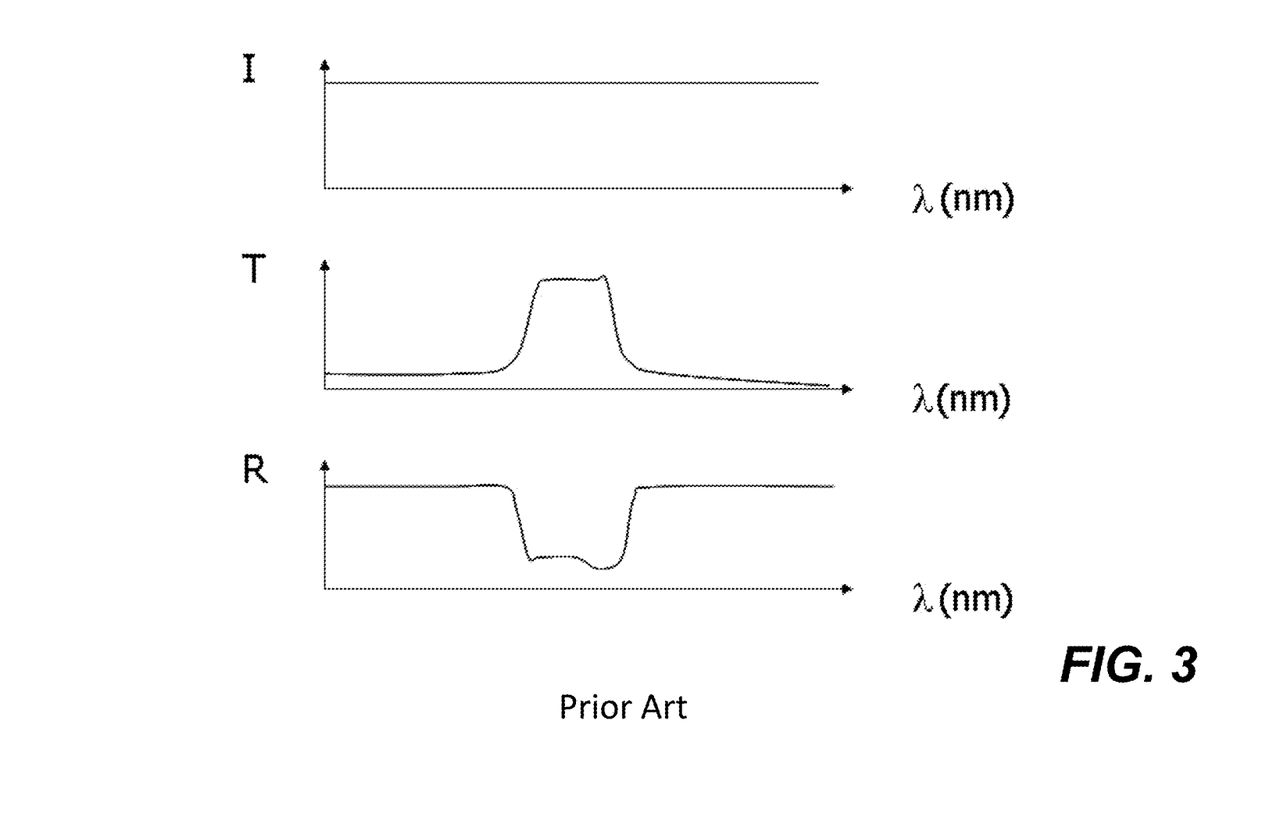
FIG. 3 shows respectively a typical spectrum for input (I), Transmission (T) and reflection (R) ports of a TFF based WDM 3-port filter.

FIG. 2 shows another prior art known as a TFF based WDM 3-port filter. A TFF is made by dielectric coatings on one side of a glass substrate in many layers of alternating high and low indices. To make a final TFF device for WDM applications, this filter is sandwiched between a pair of collimating lenses so that the light impinging upon the filter will be sufficiently collimated or close to plane wave approximations. Fibers marked as Input (I), Reflection (R) and Transmission (T) ports, are introduced by fiber pigtails formed as glass capillaries hosting fibers to the device as input and output ports. Here the TFF is shown to be attached to the lens which could be either a gradient index (GRIN) lens that has a flat end surface as shown in the main part of FIG. 2 or it is fixed to a glass sleeve over a lens of a curved end-face as shown in the inlet of FIG. 2. Either way, this prior art shows the device has 3 ports instead of 2 ports shown in the FBG filter case. Operationally, a narrow band spectrum signal passes from left through I-port to the right side or to T-port. The remaining spectrum will be reflected by the TFF to the R-port. To help visualize the spectrum, a typical spectrum for input (I), Transmission (T) and reflection (R) ports, respectively, are respectively shown in FIG. 3. As far as that for FBG is concerned, one can expect a similar spectrum, but within 2 ports instead of three. The spectrum of I and T in FIG. 3 will be all in the input fiber but in the two opposite directions of the light propagation. What appears to be at the right hand side fiber port will be the spectrum of R in the TFF configuration shown in FIG. 2.

Figure 4:
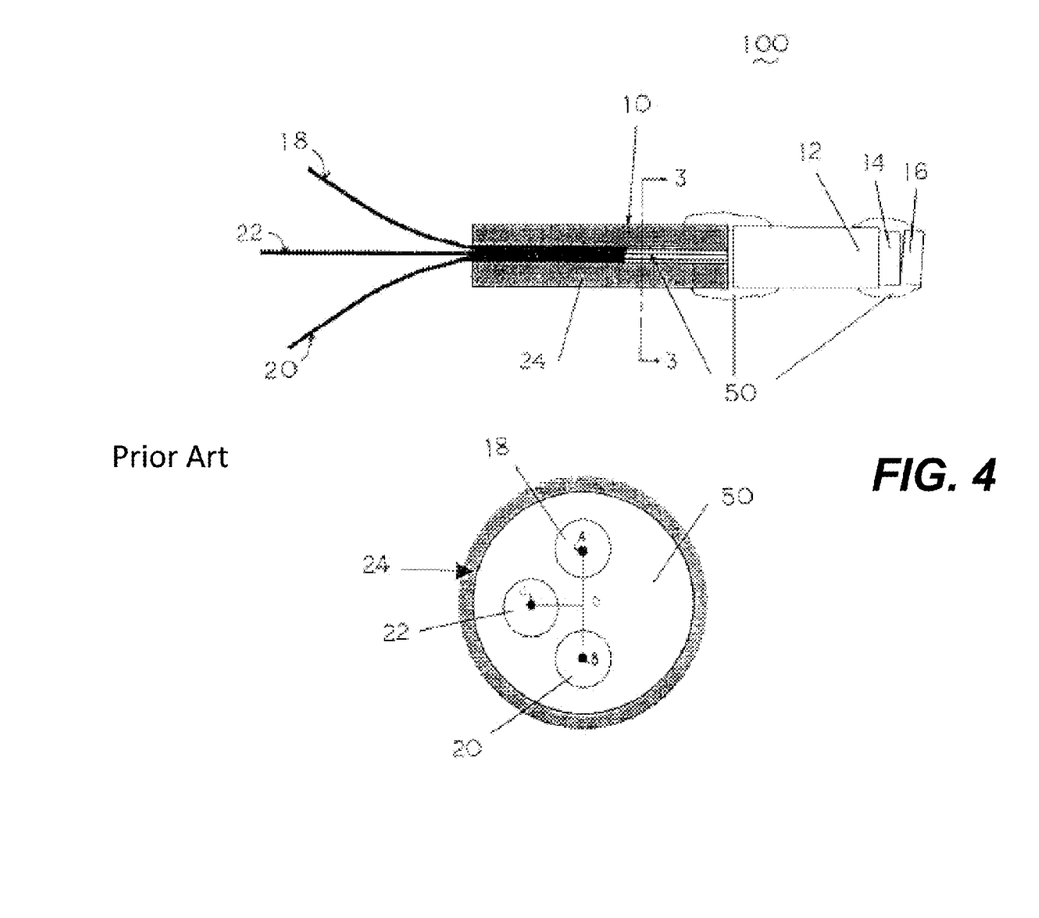
FIG. 4 depicts FIG. 1 and FIG. 4 of U.S. Pat. No. 6,400,862 in which a traditional 3-port TFF based WDM device is reconfigured to fold a Transmission port (e.g., the right side of the device shown in FIG. 2) to the left side of the device.

FIG. 4 depicts FIG. 1 and FIG. 4 of U.S. Pat. No. 6,400,862 in which a traditional 3-port TFF based WDM device is reconfigured to fold a Transmission port (e.g., the right side of the device shown in FIG. 2) to the left side of the device. The reason for making such a folding is due to the fact that all fibers would have a bend induced light loss and also due to the concern of incurring excess loss while single mode fibers are designed to have a minimum bend radius >R=25 mm. This restricts the integration dimension that a 3-port filter offers because fibers on both sides will need to observe this bend radius. Reserving 25 mm extra length that cannot be used for other functional purposes sometimes is prohibitive.

As shown in FIG. 4, one can see that instead of letting the fiber of the T-port go straightforward to the right side of the device, the light beam passing the TFF filter is folded back by a mirror so that it passes the TFF again and then through the same lens and be aligned to go into the third fiber at the same fiber pigtail device. This device can be integrated in smaller form factors as the integrator only needs to route fibers from one side of the device inside a module.

Accordingly, there is a great need for techniques for optical devices in the structure of a fiber Bragg grating device, but at the same time, the devices so designed are amenable to small footprint, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for dropping a selected wavelength or a group of wavelengths as well as demultiplexing a multiplexed signal into several signals. For simplicity, a group of selected wavelengths or channels will be deemed or described as a selected wavelength or spectrum hereinafter. According to one aspect of the present invention, an optical device employs thin film filters with reflectors to reassemble as a fiber Bragg grating. Depending on implementation, a reflector may be a mirror or a coated substrate disposed in a unique way to reflect a light beam from a filter back to a common port of a device. According to another aspect of the present invention, the reflector is coated accordingly to bypass a certain portion of the light beam for other purposes. As a result, the optical devices so designed in accordance with the present invention are amenable to small footprint, enhanced impact performance, lower cost, and easier manufacturing process.

The present invention may be used in many areas such as optical communications and devices and may be implemented in many ways as a subsystem, a device or a method. According to one embodiment, the present invention is an optical apparatus comprising an optical filter configured to pass a light signal at a selected wavelength; a collimator receiving a light beam including signals respectively at a plurality of wavelengths including the selected wavelength, the collimator coupling the light beam from a first port to the optical filter that passes the signal at the selected wavelength and reflects remaining of the light beam to a second port; and a reflector reflecting the signal at the selected wavelength back to the first port via the collimator.

The reflector is positioned with an angle so that the signal at the selected wavelength reflected by the reflector goes back right onto the first port. Depending on an exact implementation, the reflector may be a mirror or a substrate coated with a reflective material. In another embodiment, the reflective material is made to pass partially the signal at the selected wavelength to a third port located on the opposite side of the first and second ports so that the device so designed combines features of TFF and FBG WDM filters, all in one device.

According to one embodiment, the present invention is a method for an optical apparatus, the method comprises: receiving a light beam from a first port, the light beam including signals respectively at a plurality of wavelengths including a selected wavelength, coupling the light beam using a collimator to an optical filter designed to pass a light signal at the selected wavelength; and reflecting the signal at the selected wavelength by a reflector back to the first port via the collimator.

The devices so designed in accordance with the present invention are amenable to small footprint, good operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 5:
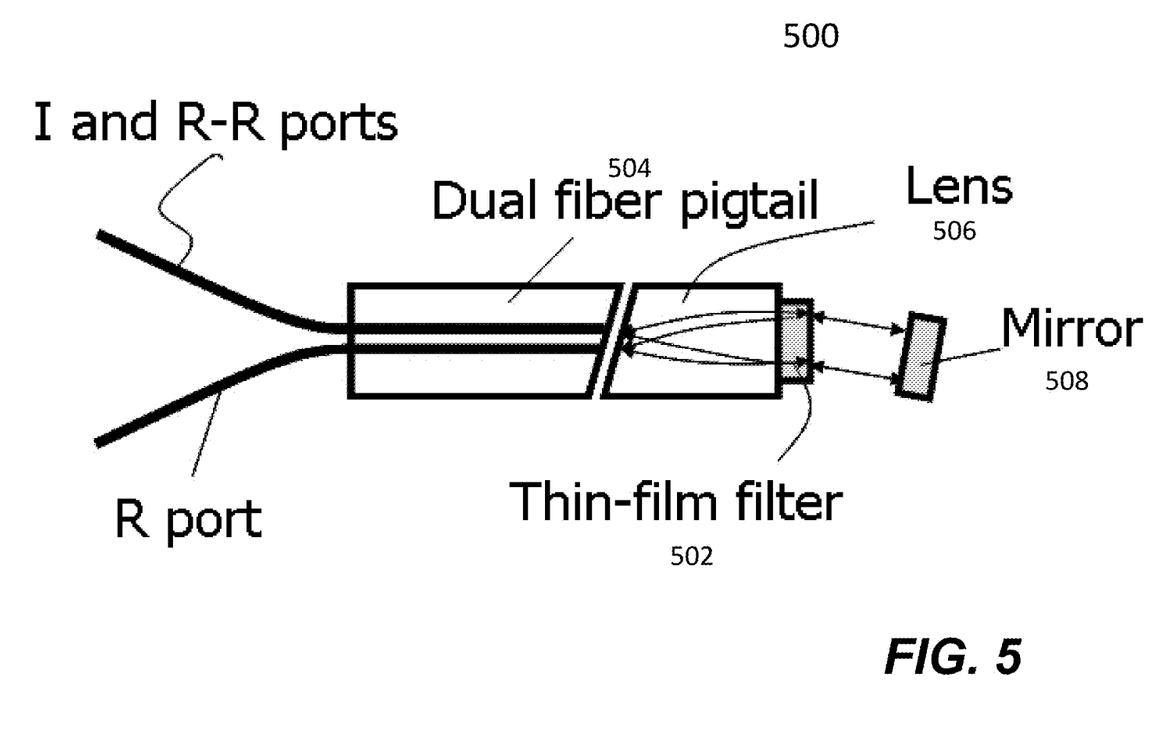
FIG. 5 shows an exemplary design according to one embodiment of the present invention.

Referring now to the drawings, in which like numerals refer to like parts throughout the several views. FIG. 5 shows an exemplary design 500 according to one embodiment of the present invention. One of the key features in the present invention is to use a thin-film filter (TFF) 502 to replicate what a FBG can functionally perform, resulting in a more cost-effective device. A TFF is known to have 5-10 times better temperature stability. A good TFF can be made to have 1 pm/° C. spectrum shift. Typical TFFs are around 2.5 pm/° C. A typical TFF in a package costs ⅓ of what a thermalized FBG package for the similar optical performance would cost. Another one of the key features in the present invention is to make the FBG like but TFF based 2-port filter to preserve the same compact packaging feature that would not have to risk bend loss from fiber ports access to the device on both sides of the device. In other words, the through port of the FBG is made on the same side of the packaged device where the input and retro-reflection ports are located.

As shown in FIG. 5, a structure of any typical 3-port TFF WDM device 500 on one side (e.g., one the left side) is preserved. A dual port fiber pigtail 504 is made to have a typically 8 degree end face to deter back-reflection or to create a high return loss. This pigtail 504 is packaged in a close contact with a lens 506 and a TFF 502 combination. The TFF 502 is disposed in contact with the lens 506. When the lens 506 sufficiently collimates a beam from the fiber 504, the beam exits from I-port of the pigtail 504. The reflected spectrum by the TFF 502 is directed through the same lens to the R-port fiber in the same fiber pigtail 506.

At the same time, the filtered spectrum is redirected by a mirror 508 on the right side of the device but to the same I-port. There is not a 3rd port. Although this is a subtle change from the prior art device, the implication of the current invention is profound as it duplicates the performance of a FBG filter cost effectively and also minimizes its packaging dimension by taking care of the folding device feature that only TFF packaging can offer. The key to success for this device is to have a reliable mirror that can redirect the spectrum signal back that was supposed to go to the T-port to the I-port to create a retro-reflection port, referred to as a R-R port.

Figure 6:
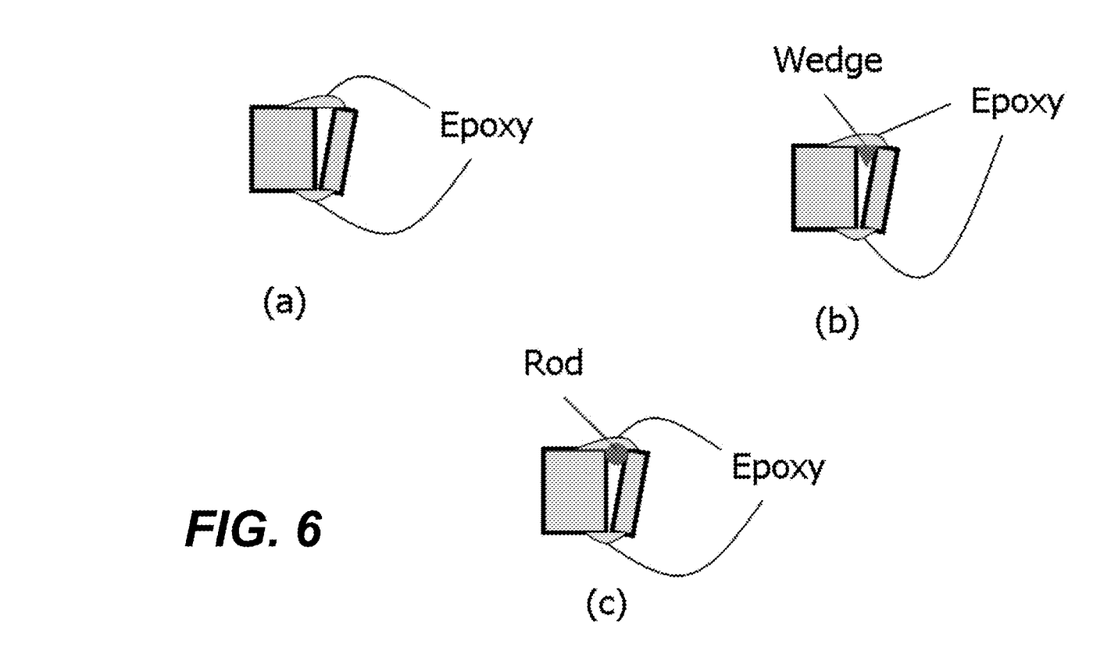
FIG. 6 shows three exemplary embodiments of mirror fixations.

FIG. 6 shows three exemplary embodiments of mirror fixations. The alignment of the mirror is done typically by a multidimensional stage (translation and rotational). The fixation however needs to assure the structure integrity over the device service life. The angle between the TFF and the mirror can vary depending on the specific selection of lens parameter and fiber pigtail's dual fiber spacing. For very small angles, one can use a direct epoxy drop to fix both sides of the mirror as shown in FIG. 6(a). For relatively larger angles, one can insert a glass or metal wedge or rod as shown in FIG. 6(b) and FIG. 6(c) before applying epoxy to stabilize integration of a TFF, a mirror and an insert (e.g., a wedge).

Figure 7:
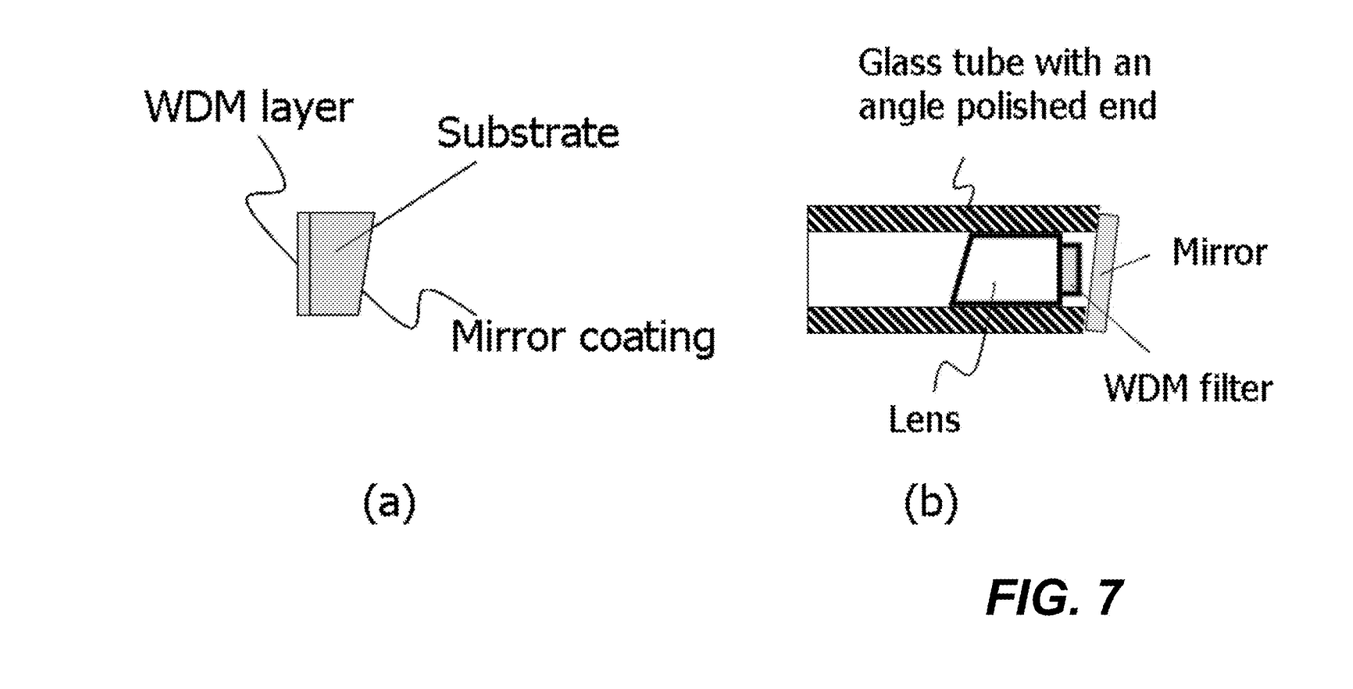
FIG. 7(a) shows that a filter back surface can be coated to reflect a light beam (equivalent to a mirror reflection purpose)
FIG. 7(b) shows another embodiment in which an end mirror is attached to a hosting sleeve accommodating a lens and a TFF.

There are at least two other ways to provide the angled mirror to support the retro-reflection. FIG. 7(a) shows that a filter back surface can be coated to reflect a light beam (equivalent to a mirror reflection purpose). A TFF is typically processed in wafers and cut into smaller slices and further polished or thinned to the final form factor. Once the packaging geometry is determined, lens and pigtail parameters are fixed and so does the angle of the mirror reflections. Thus the final polishing can be pre-made before the final dicing run into the small individual filter chips. The mirror coating can be done in two ways, either before or after the final dicing since mirror coating is a much easier task compared to the WDM coating. FIG. 7(b) shows another embodiment in which an end mirror is attached to a hosting sleeve accommodating the lens and the TFF in integration.

Figure 8:
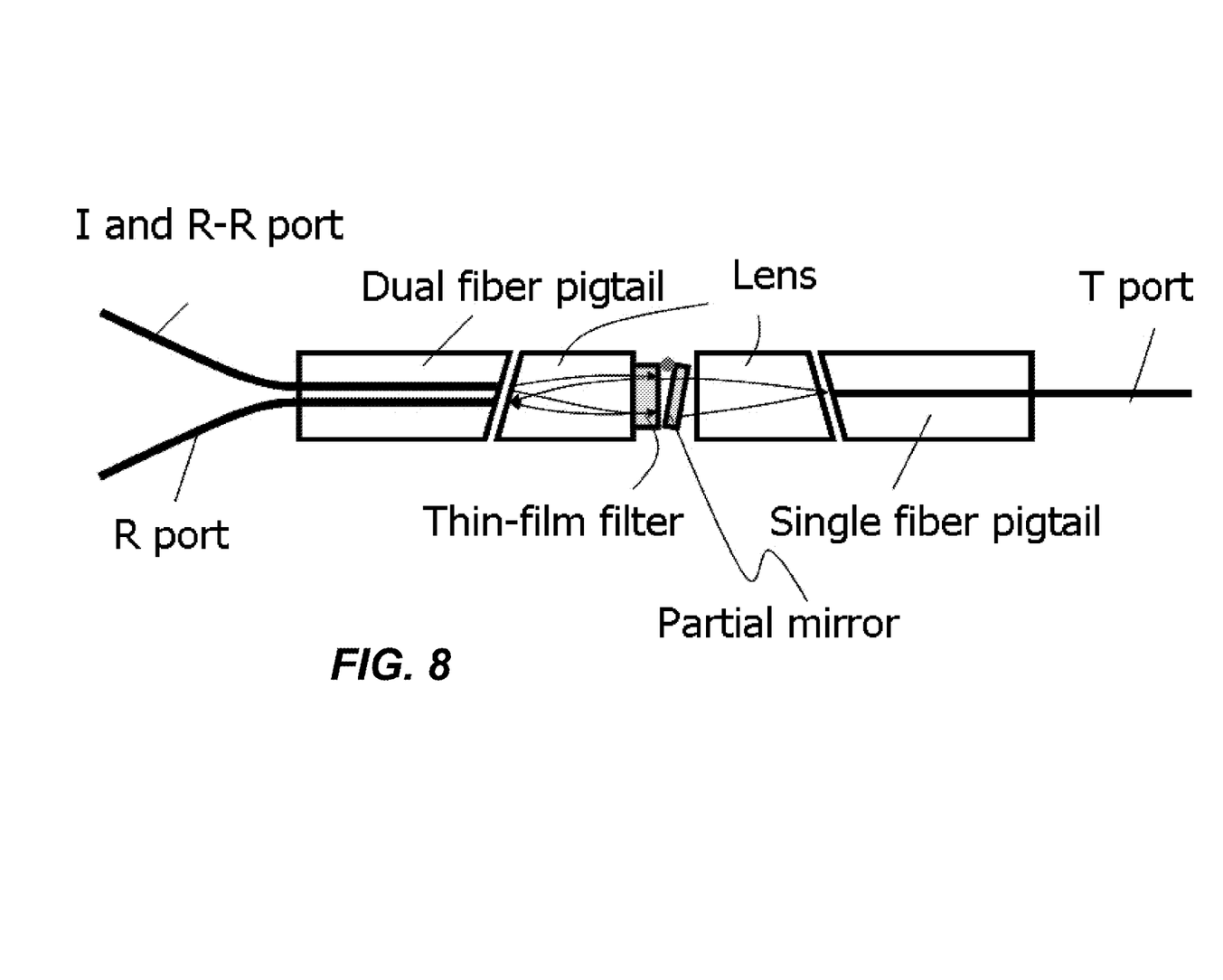
FIG. 8 shows another embodiment of the invention that combines the features of TFF and FBG WDM filters, all in one device.

FIG. 8 shows another embodiment of the invention that combines the features of TFF and FBG WDM filters, all in one device. As shown in FIG. 8, the structure of the original 3-port TFF filter is preserved, namely to have I, R and T three ports. However, an angled retro-reflector is added, wherein the retro-reflector is partially coated to reflect a portion of an incoming light beam and transmit another portion of the incoming light beam. Depending on application, the reflection factor can be adjusted accordingly.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

I claim:

1. An optical device comprising:
    a first port receiving a light beam including signals respectively at a plurality of wavelengths including a selected wavelength and outputting a reflected light beam including all of the signals except for a signal at the selected wavelength,
    a second port outputting the signal at the selected wavelength;
    an optical filter configured to pass the signal at the selected wavelength;
    a collimator receiving the light beam and coupling the light beam from the first port to the optical filter that passes the signal at the selected wavelength and produces the reflected light beam to the first port; and
    a reflector positioned with an angle with respect to the collimator so that the signal at the selected wavelength that passes the collimator is reflected by the reflector back to the collimator and goes back onto the second port, wherein the optical filter being a thin film filter (TFF) together with the angled reflector duplicates a performance of a fiber Bragg grating (FBG) filter would deliver.

2. The optical device of claim 1, wherein the first port and the second port are on one side of the optical device.

3. The optical device of claim 2, wherein the first port and the second port are from a dual fiber pigtail disposed from one side of the optical device.

4. The optical device of claim 3, wherein the angle is adjusted to an angle that the signal at the selected wavelength reflected by the reflector goes back right onto the first port.

5. The optical device of claim 4, wherein the angle is formed by keeping a gap on one side of the reflector towards the optical filter.

6. The optical device of claim 5, wherein the gap is partially filled with an object to keep the gap firm.

7. The optical device of claim 4, wherein the reflector is attached to the optical filter.

8. The optical device of claim 4, wherein the reflector is attached to a sleeve accommodating the collimator and the optical filter.

9. The optical device of claim 3, wherein the reflector is a substrate coated with a reflective material.

10. The optical device of claim 9, wherein the reflective material is made to pass partially the signal at the selected wavelength to a third port located on the opposite side of the first and second ports.

11. The optical device of claim 9, wherein the optical device combines features of TFF and FBG WDM filters, all in one device.

12. A method for an optical apparatus, the method comprising:
    receiving a light beam from a first port, the light beam including signals respectively at a plurality of wavelengths including a selected wavelength,
    coupling the light beam using a collimator to an optical filter designed to pass a light signal at the selected wavelength and reflect all at wavelengths other than the selected wavelength as a reflected light beam; and
    reflecting the signal at the selected wavelength by a reflector back to a second port via the collimator, wherein the reflector is positioned with an angle with respect to the collimator so that the signal at the selected wavelength reflected by the reflector goes back right onto the second port, and the reflected light beam, directed by the optical filter goes back right into the first port, the optical filter being a thin film filter (TFF) together with the angled reflector duplicates a performance of a fiber Bragg grating (FBG) filter would deliver.

13. The method of claim 12, wherein the first port and the second port are on one side of the optical device and from a dual fiber pigtail.

14. The method of claim 13, wherein the angle is adjusted to an angle that the signal at the selected wavelength reflected by the reflector goes back right onto the first port.

15. The method of claim 12, wherein the reflector is a substrate coated with a reflective material.

16. The method of claim 15, wherein the reflective material is made to pass partially the signal at the selected wavelength to a third port located on the opposite side of the first and second ports.

* * * * *